US012323781B2

(12) United States Patent
Liu et al.

(10) Patent No.: US 12,323,781 B2
(45) Date of Patent: Jun. 3, 2025

(54) SOUND GENERATION DEVICE AND ELECTRONIC APPARATUS

(71) Applicant: GOERTEK INC., Shandong (CN)

(72) Inventors: Chunfa Liu, Shandong (CN); Jianbin Yang, Shandong (CN); Jianxin Wang, Shandong (CN); Shousong Qiang, Shandong (CN)

(73) Assignee: GOERTEK INC., Weifang (CN)

( * ) Notice: Subject to any disclaimer, the term of this patent is extended or adjusted under 35 U.S.C. 154(b) by 194 days.

(21) Appl. No.: 17/999,876

(22) PCT Filed: Nov. 7, 2020

(86) PCT No.: PCT/CN2020/127325
§ 371 (c)(1),
(2) Date: Nov. 25, 2022

(87) PCT Pub. No.: WO2021/238073
PCT Pub. Date: Dec. 2, 2021

(65) Prior Publication Data

US 2023/0239624 A1 Jul. 27, 2023

(30) Foreign Application Priority Data

May 25, 2020 (CN) ......................... 202010458486.9

(51) Int. Cl.
*H04R 9/04* (2006.01)
*H04R 9/02* (2006.01)
*H04R 9/06* (2006.01)

(52) U.S. Cl.
CPC ............. *H04R 9/043* (2013.01); *H04R 9/025* (2013.01); *H04R 9/045* (2013.01); *H04R 9/06* (2013.01)

(58) Field of Classification Search
CPC ........ H04R 9/043; H04R 9/025; H04R 9/045; H04R 9/06
See application file for complete search history.

(56) References Cited

U.S. PATENT DOCUMENTS 10,609,488 B1 3/2020 Concessi
11,666,942 B2 * 6/2023 Williamson ........... A43B 23/00 310/36

(Continued)

FOREIGN PATENT DOCUMENTS

CN 101341791 A 1/2009
CN 202488700 U 10/2012

(Continued)

OTHER PUBLICATIONS

Translation of CN107396253A (Year: 2017).*

(Continued)

*Primary Examiner* — Andrew Sniezek
(74) *Attorney, Agent, or Firm* — Shih IP Law Group, PLLC

(57) ABSTRACT

Disclosed are a sound generation device and an electronic apparatus. The sound generation device comprises: a support; a vibration unit; and at least two elastic member. Each of the elastic member comprises: a first elastic assembly having at least one first elastic connector connected to the support and the vibration unit; and a second elastic assembly having at least one second elastic connector connected to the support and the vibration unit. The first elastic assembly and the second elastic assembly are fixed at different positions in a height direction of a voice coil. The voice coil has a first end surface in the height direction. At least a portion of a first projection region of the first elastic assembly projected onto a plane where the first end surface is located is at outside of (Continued)

a second projection region of the second elastic assembly projected onto the first end surface.

17 Claims, 14 Drawing Sheets

(56) References Cited

U.S. PATENT DOCUMENTS

| | | | |
|---|---|---|---|
| 2011/0116678 | A1 | 5/2011 | Wang |
| 2020/0107132 | A1 | 4/2020 | Concessi |

FOREIGN PATENT DOCUMENTS

| | | | | |
|---|---|---|---|---|
| CN | 107396253 | A | * 11/2017 | ............... H04R 9/02 |
| CN | 208112932 | U | 11/2018 | |
| CN | 110662155 | A | 1/2020 | |
| CN | 110719554 | A | 1/2020 | |
| CN | 210183530 | U | 3/2020 | |
| CN | 212392990 | U | 1/2021 | |
| JP | 2007081674 | A | 3/2007 | |

OTHER PUBLICATIONS

Translation of CN110719554A (Year: 2020).*

International Search Report from International Application No. PCT/CN2020/127325 mailed Jan. 11, 2021.

* cited by examiner

SOUND GENERATION DEVICE AND ELECTRONIC APPARATUS

TECHNICAL FIELD

The present disclosure relates to the technical field of electro-acoustic, and in particular, to a sound generation device and an electronic apparatus.

BACKGROUND ART

A sound generation device, which is a transducer device that converts electrical signals into sound signals, is an important acoustic component for an electronic apparatus. With the continuous development and advancing of technology, the structural design of sound generation devices has been improving and changing. A sound generation device is required to be thin, and at the same time, it is more and more important to the optimize the performance thereof, while simplifying the process and reducing the cost.

In a conventional sound generation device, elastic connectors are fixed on a voice coil bobbin to prevent the voice coil from deviation from the vibration direction during vibration process. With the improvement of the industry's requirements for loudspeaker performance, in case where the voice coil has a large displacement, the reliability of ordinary elastic connectors is low, which may lead to breakage, resulting in a failure of the sound generation device.

SUMMARY

A main object of the present disclosure is to provide a sound generation device, which aims to ensure that even in case where the voice coil has a large displacement, the elastic connector still has good reliability, and ensure the working stability of the sound generation device.

To achieve the above object, the present disclosure provides a sound generation device comprising: a support; a vibration unit having a height direction; and at least two elastic members. Each of the elastic members includes: a first elastic assembly having at least one first elastic connector, one side of the first elastic connector is connected to the vibration unit and the other side thereof is connected to the support; and a second elastic assembly having at least one second elastic connector, one side of the second elastic connector is connected to the vibration unit and the other side thereof is connected to the support, the first elastic assembly and the second elastic assembly are fixed at different positions in the height direction of the vibration unit. The vibration unit has a first end surface in the height direction, wherein at least a portion of a first projection region of the first elastic projected onto a plane where the first end surface is located is at outside of a second projection region of the second elastic assembly projected onto a plane where the first end surface is located. Alternatively, the first projection region is fully overlapped with the second projection region.

In some embodiments of the present disclosure, the first elastic assembly includes a plurality of first elastic connectors, the plurality of first elastic connectors are located at the same position in the height direction of the vibration unit, and the projection region of at least one first elastic connector onto the plane where the first end surface is located is at outside of the second projection region.

In some embodiments of the present disclosure, the second elastic assembly includes a plurality of second elastic connectors, the plurality of second elastic connectors are located at the same position in the height direction of the vibration unit, and the projection region of the first elastic connector onto the plane where the first end surface is located is at outside of the projection region of the second elastic connector onto the plane where the first end surface is located.

In some embodiments of the present disclosure, the sound generation device further includes a third elastic assembly, the third elastic assembly includes at least one third elastic connector, and the first elastic connector, the second elastic connector and the third elastic connector are fixed at different positions in the height direction of the vibration unit.

In some embodiments, at least a portion of the third projection region of the third elastic assembly projected onto the plane where the first end surface is located is at outside of the first and second projection regions. Alternatively, the third projection region is fully overlapped with the first and/or second projection region.

In some embodiments of the present disclosure, the first elastic assembly includes a plurality of first elastic connectors, and the plurality of first elastic connectors are located at the same position in the height direction of the vibration unit, the second elastic assembly includes a plurality of second elastic connectors, and the plurality of second elastic connectors are located at the same position in the height direction of the vibration unit, and the projection region of the first elastic connector onto the plane where the first end surface is fully overlapped with the projection region of the second elastic connector onto the plane where the first end surface is located.

In some embodiments of the present disclosure, the first elastic connector and/or the second elastic connector includes: a first connection part connected with the vibration unit; a second connection part connected with the support; and a deformation part between the first connection part and the second connection part, both ends of the deformation part are respectively connected with the first connection part and the second connection part, and at least a portion of the deformation part is a structure formed by winding.

In some embodiments of the present disclosure, the deformation part includes a first end connected with the first connection part, and a second end connected with the second connection part, and a central area between the first end and the second end. The deformation part is formed by extending from the first end to the central area in a straight line and/or a curve along a first direction, then extending from the central area to the second end in a straight line and/or a curve along a direction opposite to the first direction.

In some embodiments of the present disclosure, the deformation part is arranged in a helical shape. In an embodiment, the deformation part is a wire-like structure formed by winding.

In some embodiments of the present disclosure, at least one of the first elastic connectors and/or at least one of the second elastic connectors is a wire-like structure formed by winding a metal wire. In an embodiment, at least one of the first elastic connectors and/or at least one of the second elastic connectors is a wire-like structure formed by connecting at least two metal wires in parallel and side by side as a whole and then winding. In an embodiment, at least one of the first elastic connectors and/or at least one of the second elastic connectors is a wire-like structure formed by intertwining at least two metal wires with each other and then winding.

In some embodiments of the present disclosure, the wire-like structure formed by winding the metal wire includes a first wire segment and a second wire segment, and a diameter of the second wire segment is larger than a diameter of the first wire segment. In an embodiment, the wire-like structure formed by winding the metal wire has a plurality of cross-sections, and the plurality of cross-sections have different widths.

In some embodiments of the present disclosure, at least one of the first elastic connectors and/or at least one of the second elastic connectors is formed by punching. In an embodiment, a cross-sectional width of at least one of the first elastic connectors is larger than cross-sectional widths of other first elastic connectors. In an embodiment, a cross-sectional width of at least one of the second elastic connectors is larger than cross-sectional widths of other second elastic connectors. In an embodiment, at least one of the first elastic connectors and/or at least one of the second elastic connectors is a wire-like structure formed by winding.

In some embodiments of the present disclosure, the first elastic connector includes: at least two deformation parts, the at least two deformation parts are arranged at intervals and connected to the first connection part; and at least two second connection parts, at least one of the second connection parts is connected to a side of one of the deformation parts away from the first connection part, and a projection region of at least two of the deformation parts onto the plane where the first end surface is located is at outside of the second projection region.

In some embodiments of the present disclosure, the vibration unit includes a diaphragm and a voice coil connected with the diaphragm, and the elastic member connects the voice coil and the support. In an embodiment, the vibration unit includes a diaphragm, a voice coil and a cup, the voice coil and the cup are arranged on the same side of the diaphragm, and the elastic member connects the cup and the support. In an embodiment, the support is a housing or a magnetic yoke.

In some embodiments of the present disclosure, the voice coil includes a bobbin and a voice coil body wound on the bobbin, and when the elastic member connects the voice coil and the support, the voice coil body is configured to receive electrical signals, the first elastic assembly is configured to be electrically connected with the voice coil body to input an electrical signal to the voice coil body, and the second elastic assembly is connected to the bobbin. In an embodiment the voice coil includes a bobbin and a voice coil body wound on the bobbin, and when the elastic member connects the voice coil and the support, the voice coil body is configured to receive electrical signals, the second elastic assembly is configured to be electrically connected with the voice coil body to input an electrical signal to the voice coil body, and the first elastic assembly is connected to the bobbin. In an embodiment, the voice coil includes a bobbin and a voice coil body wound on the bobbin, and when the elastic member connects the voice coil and the support, the voice coil body is configured to receive electrical signals, the first elastic assembly and the second elastic assembly are both configured to be electrically connected with the voice coil body to input electrical signals to the voice coil body.

In some embodiments of the present disclosure, the material of at least one of the first elastic connectors and/or the material of at least one of the second elastic connectors includes a conductive material, and one side of at least one of the first elastic connectors and/or at least one of the second elastic connectors is electrically connected to the voice coil body, and the other side thereof is electrically connected to an external circuit.

In some embodiments of the present disclosure, the first elastic connector and/or the second elastic connector is a structure formed by an elastic material, and the conductive material is formed on a surface of the first elastic connector and/or the second elastic connector by electroplating to form a metal plating layer. In an embodiment, the conductive material is formed on a surface of the first elastic connector and/or the second elastic connector by composite/etching to form a metal film layer; the metal layer/metal film layer forms a conductive path connecting the external circuit and the voice coil body.

In some embodiments of the present disclosure, the material of the first elastic connector and/or the second elastic connector includes a non-magnetic conductive material.

In some embodiments of the present disclosure, the number of the voice coil is provided in plurality, and each of the voice coils is connected to at least one first elastic assembly and at least one second elastic assembly. In an embodiment, each of the voice coils is connected to an elastic members.

In some embodiments of the present disclosure, the housing is further provided with a plurality of fixing parts, and the fixing parts are used for fixing a side of the first elastic connector and/or the second elastic connector away from the voice coil.

In some embodiments of the present disclosure, the material of the fixing parts includes a conductive material, and is used for connecting to an external circuit.

The present disclosure also provides an electronic apparatus including a sound generation device, the sound generation device includes a support, a vibration unit having a height direction, and at least two elastic members, each of which includes: a first elastic assembly having at least one first elastic connector, one side of the first elastic connector is connected to the vibration unit and the other side thereof is connected to the support; and a second elastic assembly having at least one second elastic connector, one side of the second elastic connector is connected to the vibration unit and the other side thereof is connected to the support, the first elastic assembly and the second elastic assembly are fixed at different positions in the height direction of the vibration unit. The vibration unit has a first end surface in the height direction, at least a portion of a first projection region of the first elastic projected onto a plane where the first end surface is located is at outside of a second projection region of the second elastic assembly projected onto a plane where the first end surface is located. Alternatively, the first projection region is fully overlapped with the second projection region.

According to the present disclosure, a sound generation device includes a support, a vibration unit and an elastic member, wherein a first elastic assembly with at least one first elastic connector is provided, the first elastic connector connects the vibration unit and the support, and a second elastic assembly with at least one second elastic connector is provided, the second elastic connector connects the vibration unit and the support, wherein the first elastic assembly and the second elastic assembly are fixed at different positions in the height direction of the vibration unit. Further, the vibration unit has a first end surface in the height direction, at least a portion of a first projection region of the first elastic projected onto a plane where the first end surface is located is at outside of a second projection region of the second elastic assembly projected onto a plane where the first end surface is located. Since a plurality of elastic connectors are provided to center and support the vibration unit at the same time, a connection portion between the elastic connector and the vibration unit is increased, and thus even when the vibration unit at its large displacement, the vibration unit can still be well fixed. And since the first elastic assembly and the second elastic assembly are completely overlapped, partially overlapped and completely misaligned in a length direction of the vibration unit, the elastic connectors are well fixed at different positions in the height direction of the vibration unit, which improves the centering effect of the vibration unit, and the overlapping arrangement can centralize the connection portion between the vibration unit and the elastic connector, so as to ensure the uniformity of vibration of the vibration unit; misalignment arrangement can avoid interference between the elastic assemblies of different layers, which is more convenient for the processing and fixation of the connection portion between the vibration unit and the elastic connector, and improves the connection effect. As such, the technical solution of the present disclosure may ensure that the elastic connectors provide superior reliability in the event of a large displacement of the vibration unit, thereby ensuring stability of the sound generation device.

BRIEF DESCRIPTION OF THE DRAWINGS

Drawings are provided to illustrate the embodiments of the present disclosure. It would be understood that the drawings are only illustrative, and should not be construed as that the present disclosure is limited thereto.

REFERENCE SIGNS

Figure 1:
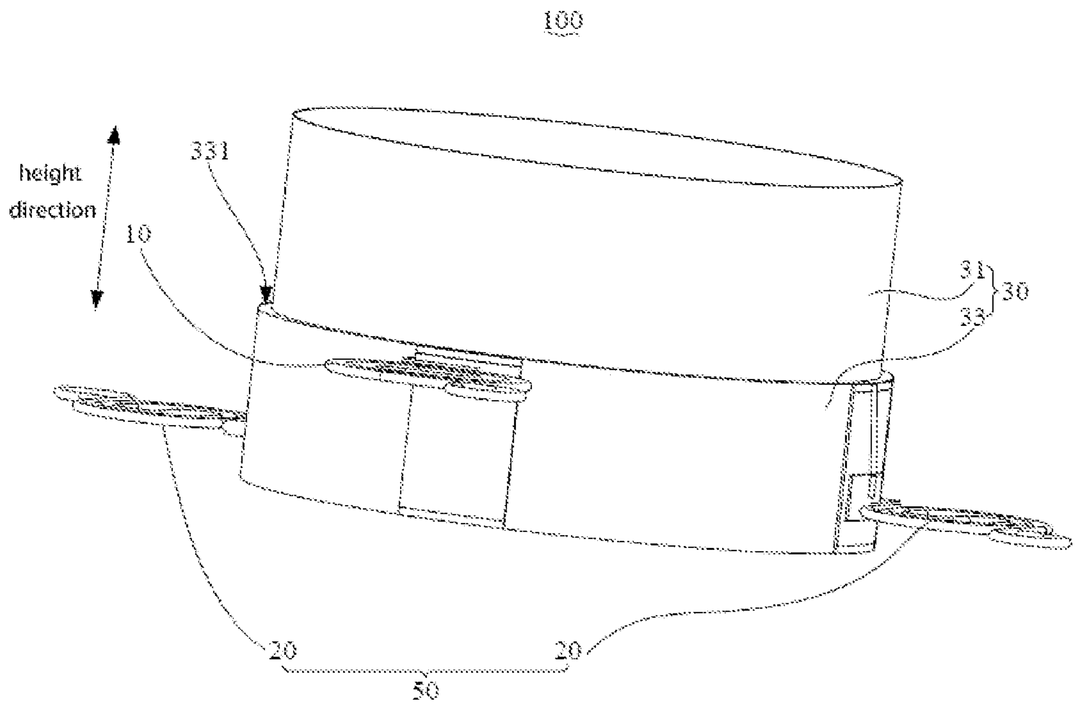
FIG. 1 is a structural schematic diagram of a sound generation device according to an embodiment of the present disclosure.
Figure 2:
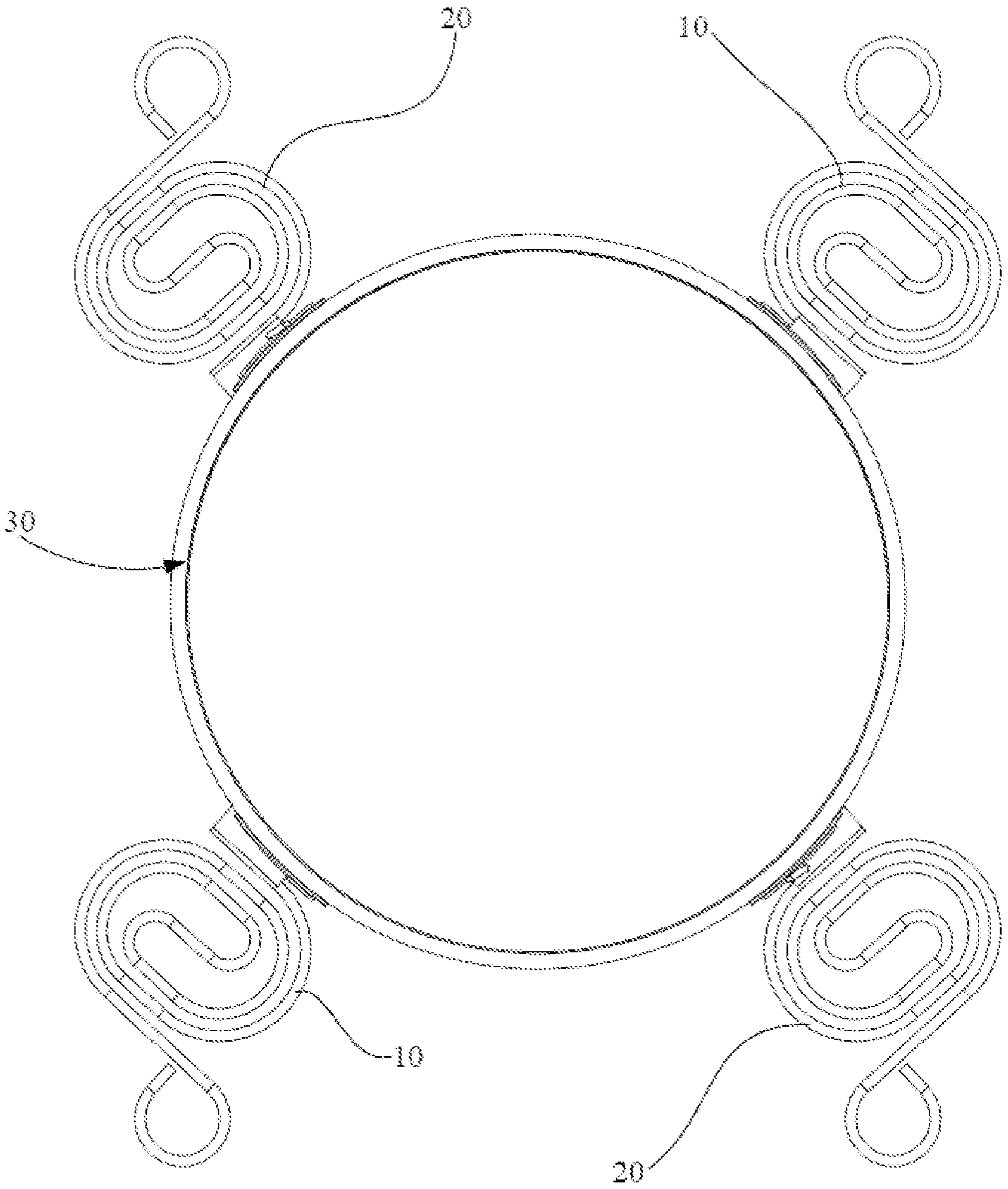
FIG. 2 is a top view of the sound generation device according to an embodiment of the present disclosure.

| Reference signs | Name | Reference signs | Name |
|---|---|---|---|
| 100 | sound generation device | 331 | first end surface |
| 10 | first elastic connector | 40 | first elastic assembly |
| 1 | first connection part | 50 | second elastic assembly |
| 2 | second connection part | 60 | elastic member |
| 3 | deformation part | 70 | third elastic assembly |
| 5 | first deformation segment | 71 | third elastic connector |
| 6 | second deformation segment | 80 | bracket |
| 7 | first wire segment | 90 | vibration unit |
| 8 | second wire segment | 91 | diaphragm |
| 20 | second elastic connector | 92 | cup |
| 30 | voice coil | 101 | magnetic circuit system |
| 31 | bobbin | 1011 | magnetic gap |
| 33 | voice coil body | | |

The solutions, features and advantages of the present disclosure will be further described with reference to the accompanying drawings through combination with the embodiments.

DETAILED DESCRIPTION OF THE EMBODIMENTS

The solutions in the embodiments of the present disclosure will be clearly and completely described through the below embodiments of the present disclosure with reference to the drawings. It would be understood that the described embodiments are only the embodiments of the present disclosure, and should be not construed as restrictive. Based on the embodiments in the present disclosure, all other embodiments those could be made by persons of ordinary skill in the art fall within the protection scope of the present disclosure.

It should be noted that all directional indications (such as up, down, left, right, front, back, etc.) in the embodiments of the present disclosure are only used to explain the relative position, motion, etc. between components in a specific view position (as shown in the drawings), and if the specific view position changes, the directional indication will change accordingly.

In addition, descriptions such as "first", "second", etc. in the present disclosure are only for descriptive purposes, and should not be construed as indicating or implying their relative importance or implicitly indicating the number indicated technical features. Thus, features defined with "first" and "second" may explicitly or implicitly include at least one such feature. In addition, the technical solutions of various embodiments of the present disclosure can be combined with each other.

In the present disclosure, unless otherwise expressly specified and limited, the terms "connected", "fixed", etc. should be understood in a broad sense. For example, "fixed" may refer to a fixed connection, a detachable connection, or may be integrated, may refer to a mechanical connection or an electrical connection, may be directly connected or indirectly connected through an intermediate medium, and it may also be an internal communication between two elements or an interaction relationship between two elements, unless otherwise specified. For those of ordinary skill in the art, the specific meanings of the above terms in the present disclosure can be understood according to specific situations.

Referring to FIGS. 1 to 9, the present disclosure provides a sound generation device 100, the sound generation device 100 includes a support 80, a vibration unit 90 having a height direction, and at least two elastic members 60. Each of the elastic members 60 includes: a first elastic assembly 40 having at least one first elastic connector 10, one side of the first elastic connector 10 is connected to the vibration unit 90 and the other side thereof is connected to the support 80; and a second elastic assembly 50 having at least one second elastic connector 20, one side of the second elastic connector 20 is connected to the vibration unit 90 and the other side thereof is connected to the support 80, and the first elastic assembly 40 and the second elastic assembly 50 are fixed at different positions in the height direction of the vibration unit 90. The vibration unit 90 has a first end surface 331 in the height direction. At least a portion of a first projection region of first elastic assembly 40 projected onto a plane where the first end surface 331 is located is at outside of a second projection region of the second elastic assembly 50 projected onto a plane where the first end surface 331 is located. In an embodiment, the first projection region is fully overlapped with the second projection region.

In an embodiment of the present disclosure, the sound generation device 100 includes: a vibration unit 90; a magnetic circuit system 101; and a housing for installing and fixing the vibration unit 90 and the magnetic circuit system 101. The vibration unit 90 includes a diaphragm 91 and a voice coil 30 under the diaphragm 91 and coupled with the diaphragm 91. The magnetic circuit system 101 includes an upper magnetic conductive plate, a magnet and a lower magnetic conductive plate. The upper magnetic conductive plate and the lower magnetic conductive plate are magnetic conductive structures for conducting magnetic lines of the magnet field. The magnetic circuit system 101 is formed with a magnetic gap 1011, and the voice coil 30 is arranged in the magnetic gap 1011 of the magnetic circuit system 101. The lower magnetic conductive plate of the present disclosure may be a U-shaped structure including a bottom wall and side walls. The magnetic gaps 1011 are formed between the side surfaces of the upper magnetic conductive plate, the magnet and the lower magnetic conductive plate, and a relatively uniform magnetic field is formed in the magnetic gap 1011, in which the voice coil 30 is disposed. Generally, the voice coil 30 is formed by winding metal wires. When the voice coil 30 is connected to the electrical signal, it vibrates up and down under due to the ampere force in the magnetic field. The vibration direction of voice coil 30 is referred to as vertical direction or up-down direction, and the vibration direction perpendicular to voice coil 30 is referred to as horizontal direction. Since the diaphragm 91 and the voice coil 30 are fixed and integrated by bonding or other means, the voice coil 30 will also drive the diaphragm 91 to vibrate when it vibrates up and down according to the electrical signal, thereby generating sound.

However, since the magnetic field in the magnetic gap 1011 is relatively but not absolutely uniform, the position of the voice coil 30 may change during the vibration of the voice coil 30, and the magnetic lines on an upper side of the magnetic gap 1011 are arc-shaped lines, thus the ampere force received by the voice coil 30 is not only in the vertical direction but also includes the ampere force in other directions, which causes the voice coil 30 deviate from the vibration direction (vertical direction) during vibration process, and then affects the vibration of the diaphragm 91.

In order to prevent the above-mentioned deviation, the elastic member 60 connecting the voice coil 30 and the support 80 is provided to center the deviation of the voice coil 30, i.e., to ensure that the voice coil 30 vibrates in the vibration direction within the magnetic gap 1011. In an embodiment, the elastic member 60 is a centering piece or a flat spring.

Figure 15:
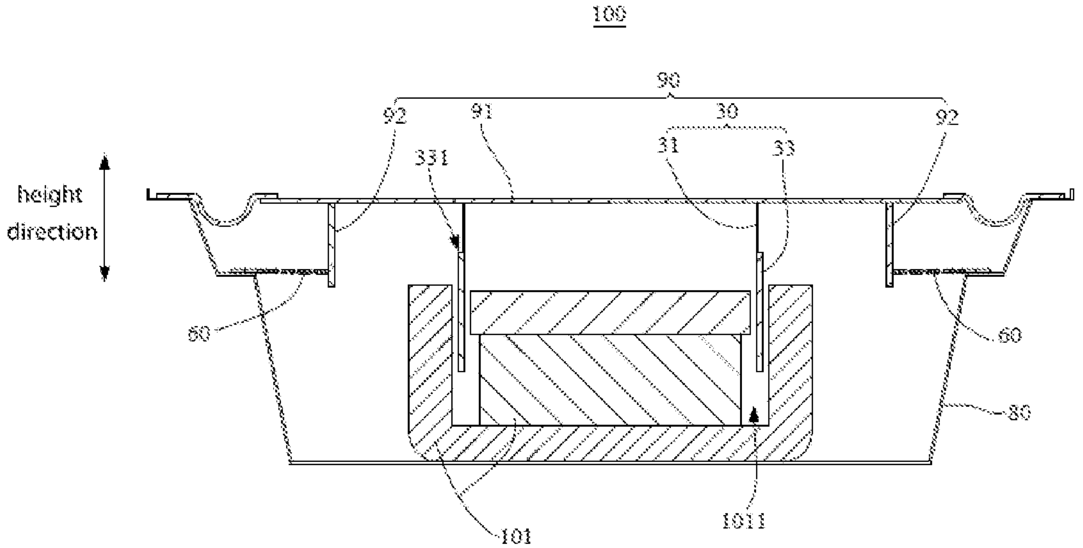
FIG. 15 is a structural schematic diagram of the sound generation device according to yet another embodiment of the present disclosure.

Referring to FIG. 15, in an embodiment, the vibration unit 90 further includes a cup 92 disposed under the diaphragm 91. The cup 92 and the voice coil 30 are arranged on the same side of the diaphragm 91, and when the magnetic gap 1011 is provided, the cup 92 is at outside of the magnetic gap 1011. The elastic member 60 connecting the cup 92 and the support 80 may be provided to center the deviation of the voice coil 30, i.e., to ensure that the voice coil 30 vibrates in the vibration direction within the magnetic gap 1011.

Figure 16:
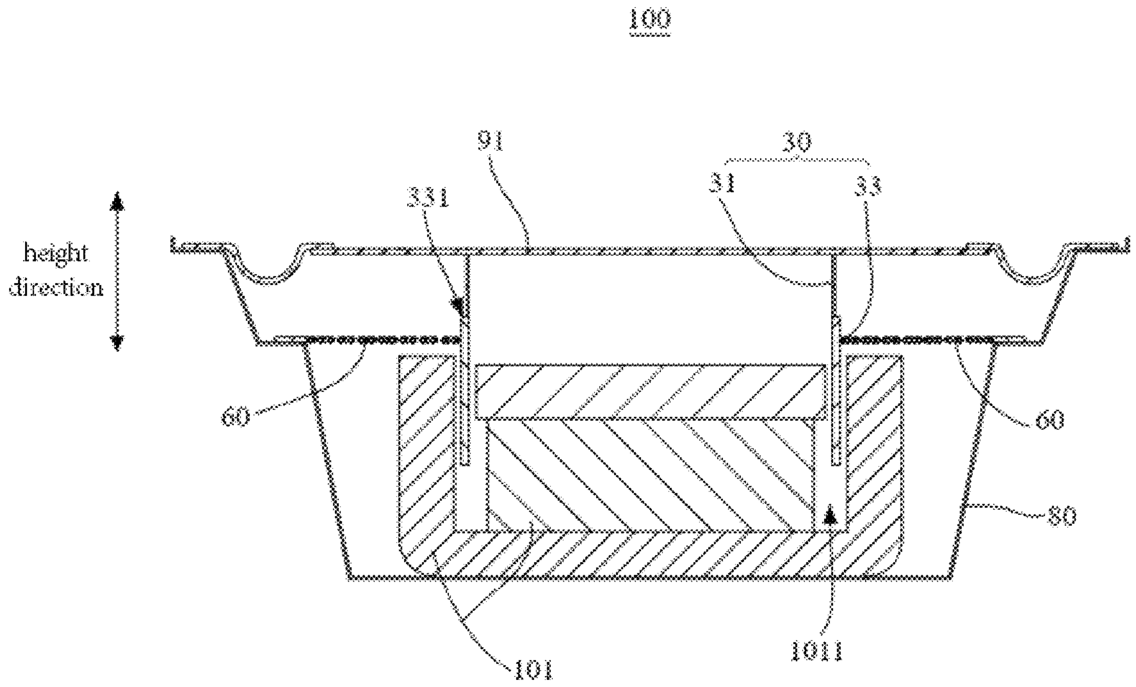
FIG. 16 is a structural schematic diagram of the sound generation device according to yet another embodiment of the present disclosure.

Referring to FIG. 16, in an embodiment, unlike the embodiment illustrated in FIG. 15, the vibration unit 90 is not provided in the sound generation device 100. In this case, the elastic member 60 may be connected between the voice coil body 33 and the support 80.

In an embodiment, the support 80 is a housing or a magnetic yoke. Since the housing may be used to carry the loudspeaker unit, providing the support 80 in a form of a housing can facilitate the fixation of the side of the elastic member 60 away from the vibration unit 90 and improve the centering support effect of the elastic member 60. Since most of the vibration unit 90 is close to the magnetic gap 1011, it is close to the magnetic yoke, and by connecting the side of the elastic member 60 away from the vibration unit 90 to the magnetic yoke, the setting distance of the elastic member 60 can be reduced and the centering support effect of the elastic member 60 can be improved. It should be noted that the fixing methods of the elastic member 60 in the embodiment may be differently configured: the elastic member 60 may be connected with the voice coil 30 and the housing, the elastic member 60 may be connected with the voice coil 30 and the magnetic yoke, the elastic member 60 may be connected with the cup 92 and the housing, and the elastic member 60 may be connected with the cup 92 and the magnetic yoke, all of which can ensure the centering support effect of the elastic member 60.

It will be understood that the cup 92 may be arranged along the circumference of the voice coil 30. Specifically, the cup 92 may be arranged around the voice coil 30. In an embodiment, the cup 92 may be formed of a plurality of discontinuous cup segments, and the cup segments are arranged with intervals and uniformly arranged along the circumferential of the voice coil 30.

It should be noted that the vibration unit 90 has a first end surface 331 and a second end surface opposite to each other, and in the embodiment, the one end surface (i.e., the first end surface 331) selected for description is only illustrative.

According to the present disclosure, a sound generation device 100 includes a support 80, a vibration unit 90 and an elastic member 60. In addition, a first elastic assembly 40 with at least one first elastic connector 10 may be further provided. The first elastic connector 10 connects the vibration unit 90 and the support 80. A second elastic assembly 50 with at least one second elastic connector 20 may also be provided, the second elastic connector 20 connects the vibration unit 90 and the support 80. The first elastic assembly 40 and the second elastic assembly 50 are fixed at different positions in the height direction of the vibration unit 90. Further, the vibration unit 90 has a first end surface 331 in the height direction. At least a portion of a first projection region of first elastic assembly 40 projected onto a plane where the first end surface 331 is located is at outside of a second projection region of the second elastic assembly 50 projected onto a plane where the first end surface 331 is located. Since a plurality of elastic connectors are provided to centering support the vibration unit 90 at the same time, a connection portion between the elastic member 60 and the vibration unit 90 is increased, and thus even in case where the vibration unit 90 has a large displacement, the vibration unit 90 can still be well fixed. Since the first elastic assembly 40 and the second elastic assembly 50 are completely overlapped, partially overlapped and completely misaligned in a length direction of the vibration unit 90, the elastic connectors are well fixed at different positions in the height direction of the vibration unit 90, which improves the centering effect of the vibration unit 90, and the overlapping arrangement can centralize the connection portion between the vibration unit 90 and the elastic member 60, so as to ensure the uniformity of vibration of the vibration unit 90. Misalignment arrangement can avoid the interference between the elastic assemblies of different layers, which is more convenient for the processing and fixation of the connection portion between the vibration unit 90 and the elastic connector, and improves the connection effect. As such, the technical solution of the present disclosure may ensure that the elastic connectors provide superior reliability in the event of a large displacement of the vibration unit 90, thereby ensuring stability of the sound generation device 100.

Referring to FIGS. 1, 2, 4-6, in some embodiments of the present disclosure, the first elastic assembly 40 includes a plurality of first elastic connectors 10, and the plurality of first elastic connectors 10 are located at the same position in the height direction of the vibration unit 90, and the projection region of at least one first elastic connector 10 onto the plane where the first end surface 331 is located is at outside of the second projection region. By providing a plurality of first elastic connectors 10, the bonding area of the first elastic assembly 40 and the vibration unit 90 is increased, thereby improving the fixing effect of the first elastic assembly 40 to the vibration unit 90. Meanwhile, by arranging the first elastic connectors 10 on the same plane, the centering effect on the vibration unit 90 can be ensured and the operation stability of the vibration unit 90 can be ensured. In the embodiment, by disposing at least one first elastic connector 10 to be misaligned with respect to the second elastic assembly 50 in the height direction of the vibration unit 90, the distribution of the first elastic connector 10 in the vibration unit 90 is more uniform, and a centering support system formed by the first elastic assembly 40 and the second elastic assembly 50 is more uniform relative to the circumferential distribution of the vibration unit 90, which is facilitate to the processing and fixation of the connection portion between the first elastic connector 10 and the second elastic connector 20 and the vibration unit 90, and effectively improves the vibration stability of the vibration unit 90.

In some embodiments of the present disclosure, the second elastic assembly 50 includes a plurality of second elastic connectors 20, and the plurality of second elastic connectors 20 are located at the same position in the height direction of the vibration unit 90, and the projection region of the first elastic connector 10 onto the plane where the first end surface 331 is located is at outside of the projection region of the second elastic connector 20 onto the plane where the first end surface is located 331. By providing a plurality of second elastic connectors 20, the bonding area of the second elastic assembly 50 and the vibration unit 90 is increased, thereby improving the fixing effect of the second elastic assembly 50 to the vibration unit 90. In addition, by arranging the second elastic connectors 20 on the same plane, the centering effect on the vibration unit 90 can be ensured and the operation stability of the vibration unit 90 can be ensured. In the embodiment, by disposing the first elastic connector 10 to be misaligned with respect to the second elastic connector 20 in the height direction of the vibration unit 90, the distribution of the second elastic connector 20 in the vibration unit 90 is more uniform, and the centering support system formed by the first elastic assembly 40 and the second elastic assembly 50 is more uniform relative to the circumferential distribution of the vibration unit 90, which is facilitate to the processing and fixation of the connection portion between the first elastic connector 10 and the second elastic connector 20 and the vibration unit 90, and effectively improves the vibration stability of the vibration unit 90.

Figure 7:
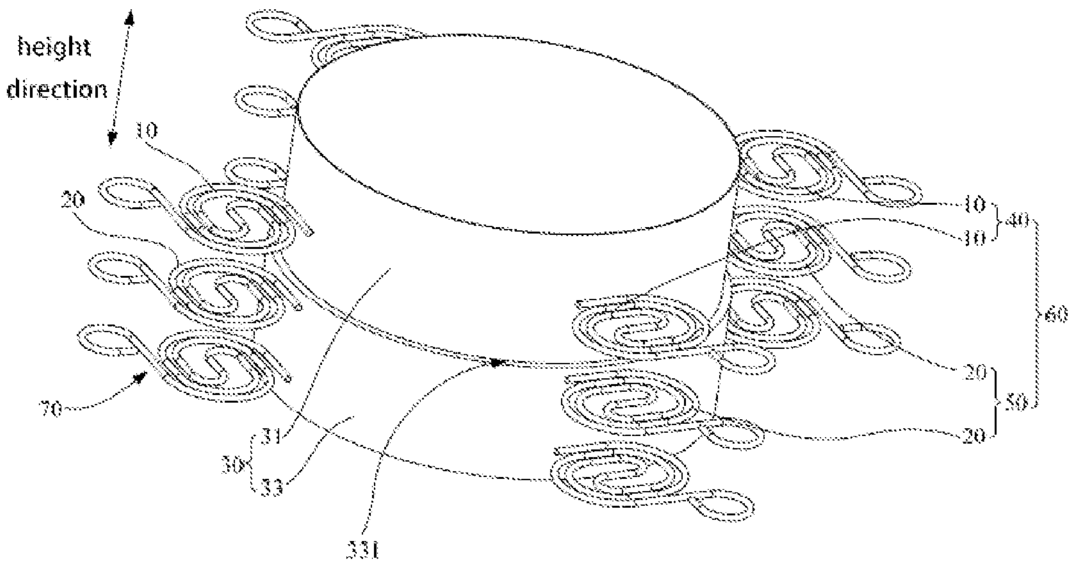
FIG. 7 is a structural schematic diagram of the sound generation device according to still another embodiment of the present disclosure.
Figure 8:
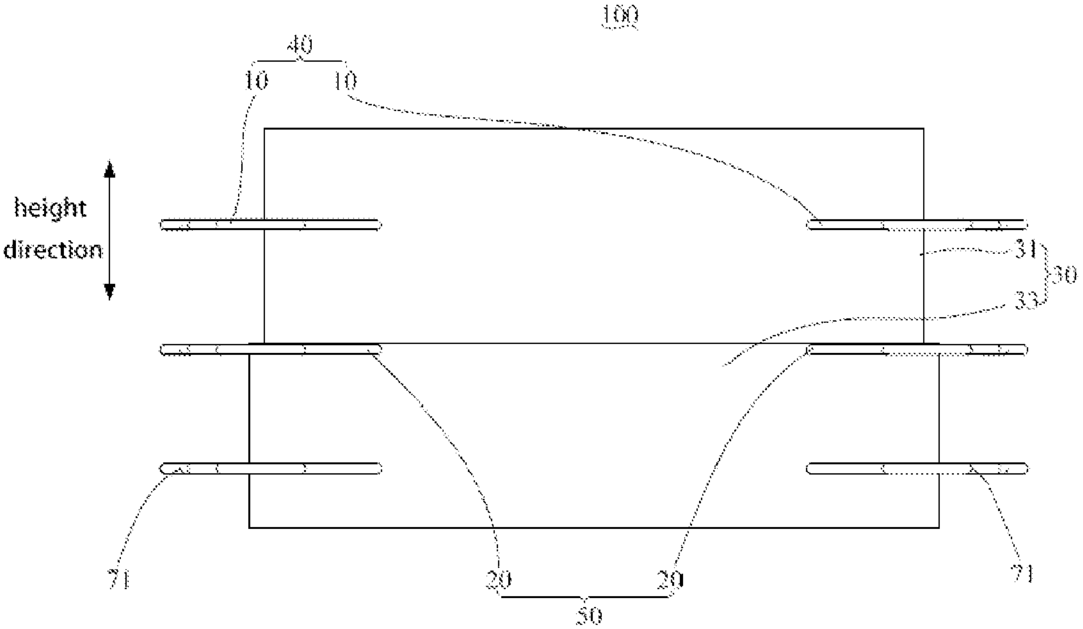
FIG. 8 is a side view of the sound generation device according to an embodiment of the present disclosure.

Referring to FIGS. 7 and 8, in some embodiments of the present disclosure, the sound generation device 100 further includes a third elastic assembly 70, the third elastic assembly 70 includes at least one third elastic connector 71, and the first elastic connector 10, the second elastic connector 20 and the third elastic connector 71 are fixed at different positions in the height direction of the vibration unit 90.

At least a portion of the third projection region of the third elastic assembly 70 projected onto a plane where the first end surface 331 is located is at outside of the first and second projection regions. In an embodiment, the third projection region is fully overlapped with the first and/or second projection region.

In the embodiment, a third elastic assembly 70 having at least one third elastic connector 71 is provided, and since the first elastic assembly 40, the second elastic assembly 50 and the third elastic assembly 70 are completely overlapped, partially overlapped and completely misaligned in the length direction of the vibration unit 90, the elastic connectors are well fixed at different positions in the height direction of the vibration unit 90, which improves the centering effect of the vibration unit 90, and the overlapping arrangement can centralize the connection portion between the vibration unit 90 and the elastic member 60, so as to ensure the uniformity of vibration of the vibration unit 90. Misalignment arrangement can avoid interference between the elastic assemblies of different layers, which is more convenient for the processing and fixation of the connection portion between the elastic connectors and the vibration unit 90, and improves the connection effect. It will be understood that, in case of a larger height, a fourth elastic assembly or more elastic assemblies may be provided to be partially overlapped or completely misaligned with the first elastic assembly 40, the second elastic assembly 50 and the third elastic assembly 70 in the length direction of the vibration unit 90. As the number of the elastic assembly increases, the misalignment arrangement can ensure better connection effect between each set of elastic connectors and the vibration unit 90 and the housing, greatly improving the centering effect of the vibration unit 90.

Figure 9:
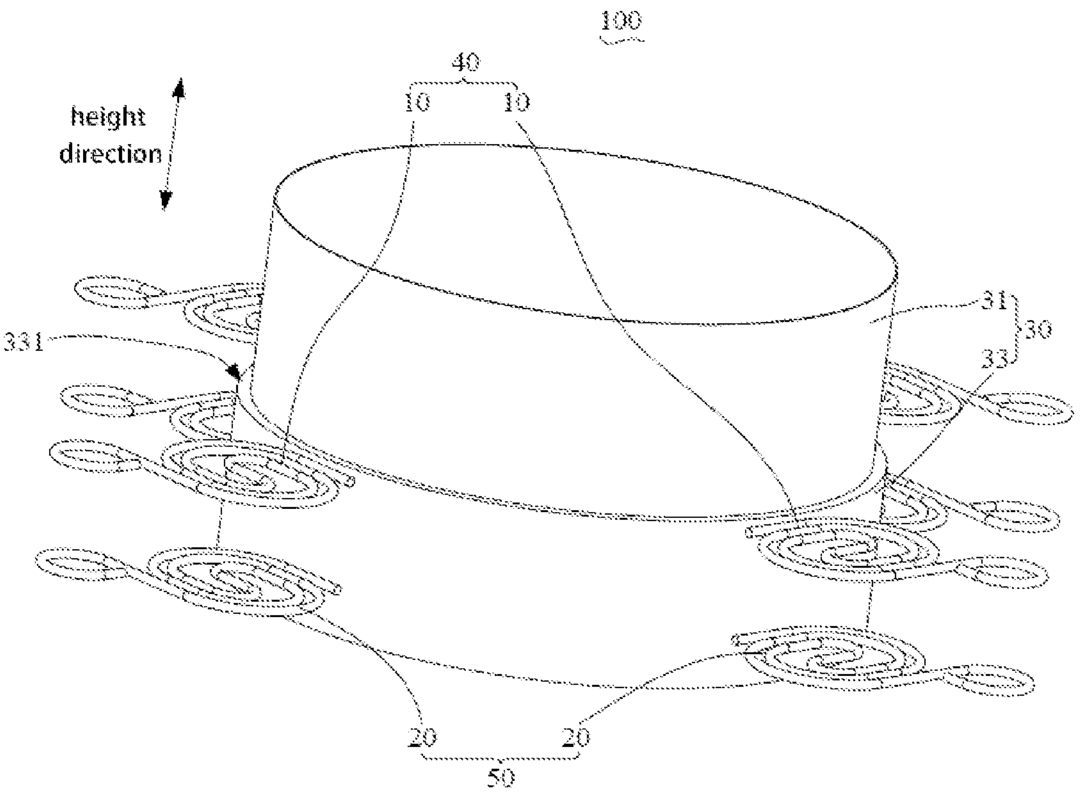
FIG. 9 is a structural schematic diagram of the sound generation device according to yet another embodiment of the present disclosure.

Referring to FIGS. 7 to 9, in some embodiments of the present disclosure, the first elastic assembly 40 includes a plurality of first elastic connectors 10, and the plurality of first elastic connectors 10 are located at the same position in the height direction of the vibration unit 90. The second elastic assembly 50 includes a plurality of second elastic connectors 20, and the plurality of second elastic connectors 20 are located at the same position in the height direction of the vibration unit 90. The projection region of the plurality of first elastic connector 10 onto the plane where the first end surface 331 is fully overlapped with the projection region of the plurality of second elastic connector 20 onto the plane where the first end surface 331 is located. In the embodiment, by providing a plurality of first elastic connectors 10 and a plurality of second elastic connectors 20, the bonding area of the set of first elastic connectors 10 and the set of the second elastic connectors 20 relative to the vibration unit 90 is increased, thereby improving the fixing effect of the elastic connector on the vibration unit 90, and the overlapping arrangement can centralize the connection portion between the vibration unit 90 and the elastic member 60, so as to ensure the uniformity of vibration of the vibration unit 90.

Referring to FIGS. 10 to 14, in some embodiments of the present disclosure, the first elastic connector 10 and/or the second elastic connector 20 includes: a first connection part 1 connected with the vibration unit 90; a second connection part 2 connected with the support 80; and a deformation part 3 between the first connection part 1 and the second connection part 2, both ends of the deformation part 3 are respectively connected with the first connection part 1 and the second connection part 2, and at least a portion of the first elastic connector 10 is a structure formed by winding.

The elastic connector is connected with the vibration unit 90 through its first connection part 1. In addition, the elastic connector constrains the reciprocating vibration of the vibration unit 90 according to the vibration offset state of the vibration unit 90 through the elastic deformation of its deformation part 3, so that the vibration unit 90 is stabilized in the preset central area, the deviation of the vibration unit 90 is prevented and the reciprocating vibration of the vibration unit 90 is more stable. In an embodiment, the elastic connector can have both the functions of conducting electricity and centering, and can realize the conduction of the internal and external circuits and the centering of the vibration of the vibration unit 90 at the same time, which can not only reduce the space occupied in the cavity of the sound generation device 100, but also effectively simplify the assembly process of the sound generation device 100.

In the embodiment, at least a portion of the first elastic connector 10 or the second elastic connector 20 is a wire-like structure formed by winding, the wound wire-like portion has larger elastic deformation, is easy to produce and have better compliance even in case where the vibration displacement of the vibration unit 90 is large. It will be understood that the first elastic connector 10 or the second elastic connector 20 may be a combination of a wire-like structure and a plate-shaped structure, a whole wire-like structure, or a combination of a wire-like structure and a strip-shaped structure.

In an embodiment, the elastic connector may be made of a non-magnetic conductive material, generally a non-ferrous metal, and specifically may be made of at least one of phosphor bronze, iron, steel or alloy materials, such materials are not susceptible to environmental changes, not easy to deform under high temperature and high humidity environment, and the hardness may not be changed, they have good fatigue resistance, so that the sound generation device 100 can work in severe operation conditions, therefore, the product performance can be optimized and the application universality of the sound generation device 100 can be improved.

Figure 10:
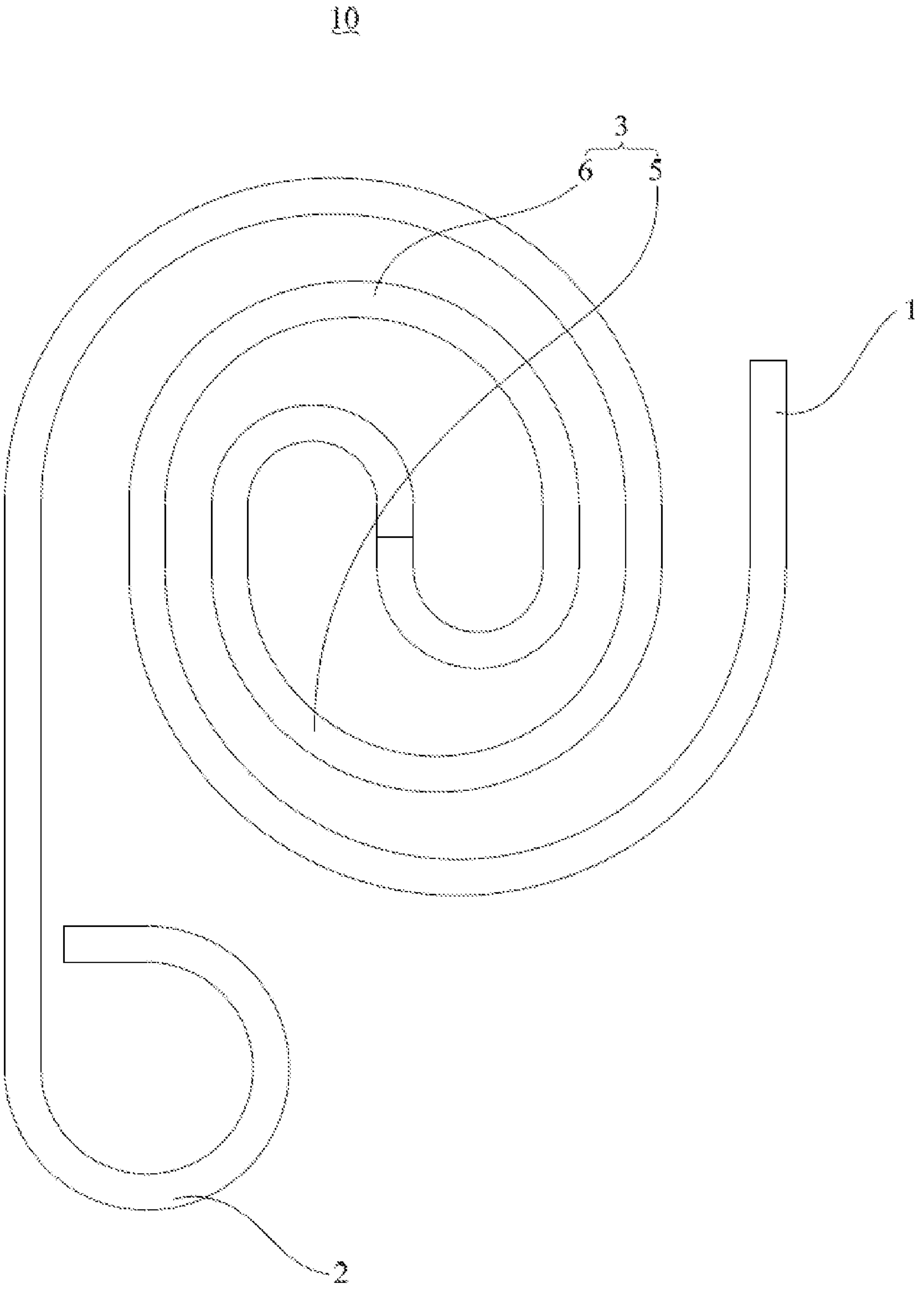
FIG. 10 is a structural schematic diagram of a first elastic connector of the sound generation device according to an embodiment of the present disclosure.

Referring to FIG. 10, in some embodiments of the present disclosure, the deformation part 3 includes a first end connected with the first connection part 1, and a second end connected with the second connection part 2, and a central area between the first end and the second end. The deformation part 3 is formed by extending from the first end to the central area in a straight line and/or a curve along a first direction, then extending from the central area to the second end in a straight line and/or a curve along a direction opposite to the first direction. It will be understood that the first end extends to the central area in a straight line and/or a curve along the first direction and forms a first deformation segment 5, the first deformation segment 5 located in the central area extends to the second end in a straight line and/or a curve along the direction opposite to the first direction and forms a second deformation segment 6, the first deformation segment 5 and the second deformation segment 6 are connected to form the deformation part 3. As such, the first deformation segment 5 and the second deformation segment 6 have long lengths on the premise that the deformation part 3 occupies a reduced space, thereby obtaining a larger elastic deformation. In the embodiment, the deformation part 3 of the elastic connector may be a planar structure, and the deformation part 3 is located in the same horizontal plane as the first connection part 1 and the second connection part 2, so that the entire elastic connector has a planar structure. Compared with the existing elastic connectors, the embodiment improves the overall flatness of the elastic connector, further reduces the height of the sound generation device 100 in the vertical direction, and realizes thin products.

The first direction may be a clockwise direction, and the deformation part 3 may have a polygonal spiral structure, specifically a structure of quadrilateral, pentagon, hexagon, etc., or a structure of circular or elliptical. Alternatively, the deformation part 3 may be coupled with straight line and curve shape, for example, a portion of the first deformation segment 5 is in a straight line, and the other portion thereof is in an arc line, specifically, the first deformation segment 5 may have a shape in which an arc line and a straight line are alternately connected. It should be noted that the alternation here is not limited to an alternation of one by one, but may also be an alternation of one by many and many by many.

In some embodiments of the present disclosure, the deformation part 3 is arranged in a helical shape. In a limited space, the helical shape enables the deformation part 3 to form a structure having good elastic deformation by helical extension, and thus the deformation part 3 can ensure good centering support for the vibration unit 90, and reduce the required space.

The deformation part 3 is a wire-like structure formed by winding. The wound wire-like structure has larger elastic deformation, is easy to produce and have better compliance even in case where the vibration displacement of the vibration unit 90 is large.

Figure 11:
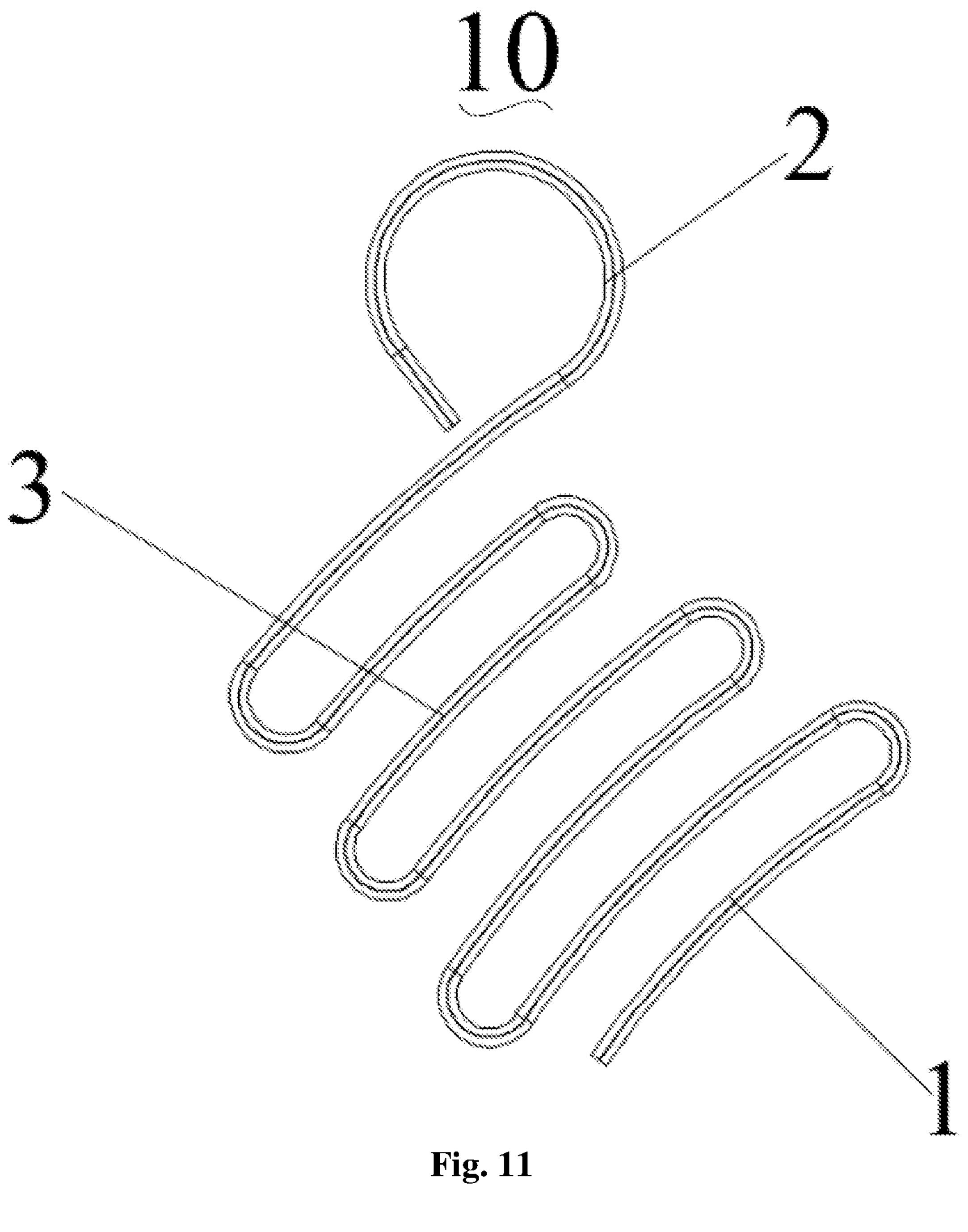
FIG. 11 is a structural schematic diagram of a first elastic connector of the sound generation device according to another embodiment of the present disclosure.
Figure 12:
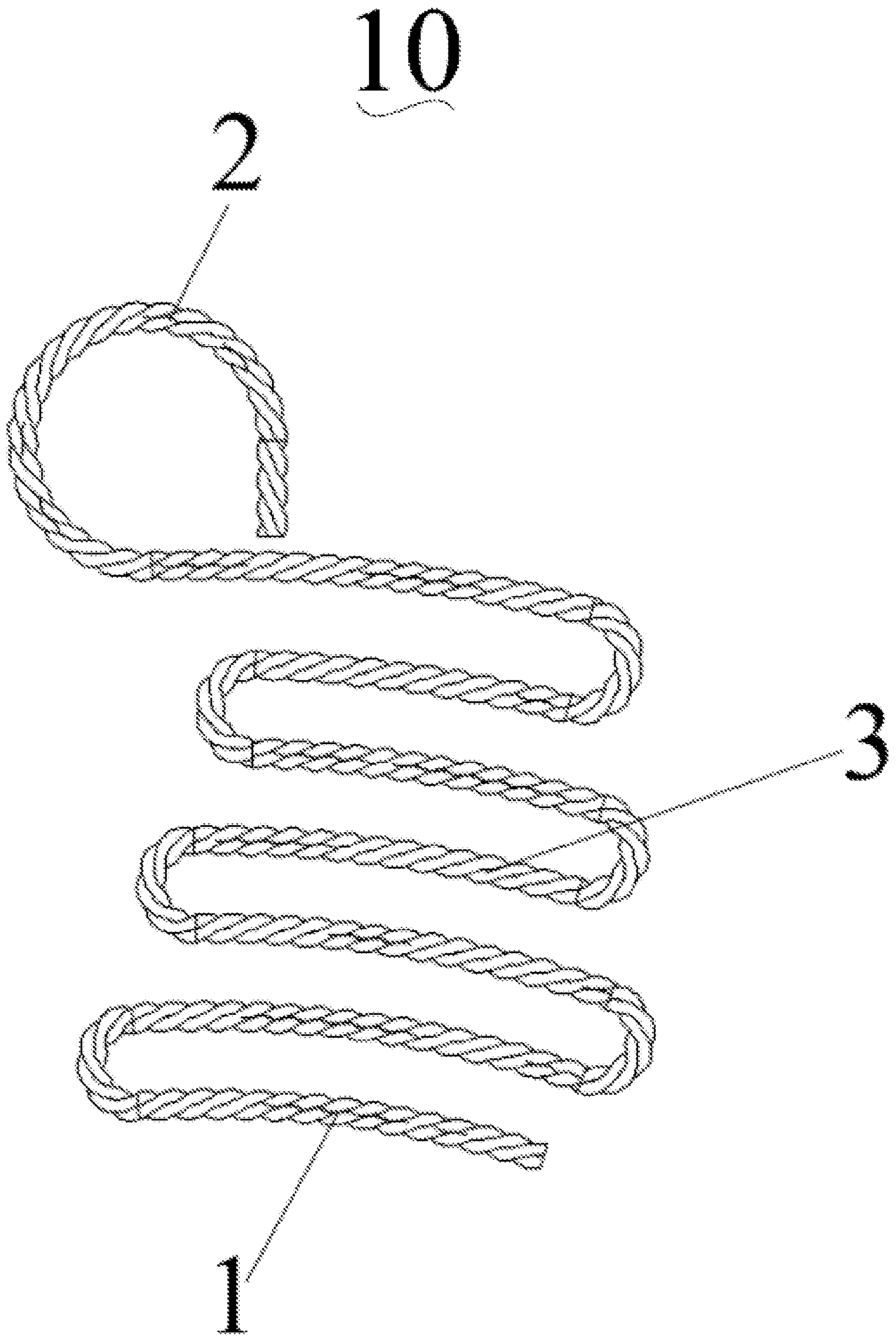
FIG. 12 is a structural schematic diagram of a first elastic connector of the sound generation device according to still another embodiment of the present disclosure.

Referring to FIGS. 10 to 12, in some embodiments of the present disclosure, at least one of the first elastic connectors 10 and/or at least one of the second elastic connectors 20 is a wire-like structure formed by winding a metal wire. In an embodiment, at least one of the first elastic connectors 10 and/or at least one of the second elastic connectors 20 is a wire-like structure formed by connecting at least two metal wires in parallel and side by side as a whole and then winding. In an embodiment, at least one of the first elastic connectors 10 and/or at least one of the second elastic connectors 20 is a wire-like structure formed by intertwining at least two metal wires with each other and then winding. In an embodiment, a variety of wire-like structures wound by metal wires are provided. The elastic connector of a metal wire has a good elastic deformation function. The elastic connector of two metal wires wound in parallel has a certain structural strength and has a certain elastic deformation function. The elastic connector of multiple metal wires intertwined has better structural strength. The aforementioned elastic connectors can be selected according to the shape of the vibration unit 90, the type of the loudspeaker, etc., as long as it can better adapt to the vibration of the vibration unit 90. Specifically, in an embodiment, the first elastic assembly 40 includes three first elastic connectors 10, one of which is made of a metal wire, and one of which is made of metal wires wound in parallel, the other of which is made of multiple metal wires intertwined, and the three first elastic connectors 10 are arranged on the same plane of the vibration unit 90. In this way, the centering support for the vibration unit 90 may be improved, and the working stability of the vibration unit 90 may also be improved.

In some embodiments of the present disclosure, the wire-like structure formed by winding the metal wire includes a first wire segment 7 and a second wire segment 8, and a diameter of the second wire segment 8 is larger than a diameter of the first wire segment 7. It should be noted that the wire segments in the embodiment can be different according to the bending direction. For example, the wound wire-like structure has a straight segment and a curved segment, the straight segment may be a wire segment, the curved segment may be a wire segment. For a curved segment, a segment that bends clockwise may be a wire segment, a segment that bends counterclockwise may be a wire segment. In addition, a straight segment extending in one direction may be a wire segment, a straight segment extending in another direction may be a wire segment. In an embodiment, the wire segments can be different by defining a certain length, and the specific length can be limited according to actual requirements. For example, it may be any value between 0.1 μm to 1 mm. Due to different diameters, the structural strength of certain positions of the elastic connector may be higher, and since the diameters of the second wire segment 8 and the first wire segment 7 are different, the first wire segment 7 and the second wire segment 8 have different power consumption for generating vibrations of the same frequency. As such, the resonance frequency of the elastic connectors can be further changed, and the probability of resonance of the elastic connectors can be greatly reduced.

In an embodiment, the wire-like structure formed by winding the metal wire has a plurality of cross-sections, and the plurality of cross-sections have different widths. It will be understood that the elastic connector may have a wire-like structure with different cross-sectional widths. For example, the cross-sectional width of the side close to the vibration unit 90 is smaller, and the cross-sectional width of the side away from the vibration unit 90 is larger. In this way, the elastic connector may have a larger elastic deformation near the vibration unit 90 and have a more stable structural away from the vibration unit 90.

In some embodiments of the present disclosure, at least one of the first elastic connectors 10 and/or at least one of the second elastic connectors 20 is formed by punching. In the embodiment, the elastic connector is a narrow and long structure integrally formed by punching, which is simple and convenient to manufacture, simplifies the manufacturing process, has high manufacturing efficiency, and reduces the manufacturing cost. In addition, the flatness and dimensional tolerance of the elastic connector formed by punching are easier to control, and the product yield is high. The elastic connector in the embodiment will not increase the height of the sound generation device 100 in the vertical direction, occupies less space and can reduce the thinness of the product. In addition, during the vertical displacement of the elastic connector following the vibration unit 90, the elastic deformation of the narrow and long deformation part 3 is large enough such that even in case where the vibration unit 90 has a large vibration displacement, the elastic connector has better compliance, thereby proving sufficient displacement without affecting the vibration of the vibration unit 90, and optimizing the product performance.

In some embodiments of the present disclosure, a cross-sectional width of at least one of the first elastic connectors 10 is larger than cross-sectional widths of other first elastic connectors. In an embodiment, a cross-sectional width of at least one of the second elastic connectors 20 is larger than cross-sectional widths of other second elastic connectors. By providing the first elastic connectors 10 with different cross-sectional widths, the first elastic assembly 40 has different elastic deformations at different positions, the vibration units 90 is adapt to different shapes and different types of loudspeakers, and thus improve the centering effect on the vibration unit 90.

In some embodiments of the present disclosure, at least one of the first elastic connectors 10 and/or at least one of the second elastic connectors 20 is a wire-like structure formed by winding. The wound wire-like structure has larger elastic deformation, is easy to produce and have better compliance in case where the vibration displacement of the vibration unit 90 is large. It will be understood that the type of elastic connector in the aforementioned embodiments can be arbitrarily selected from the first elastic assembly 40. For example, the first elastic assembly 40 may include a first elastic connector 10 formed by punching, a first elastic connector 10 of a wound wire-like structure, a first elastic connector 10 of different cross-sections, and so on. Accordingly, different centering supports at different positions of the voice coil 30 can be realized and the fixing effect of the elastic member 60 can be improved.

Figure 3:
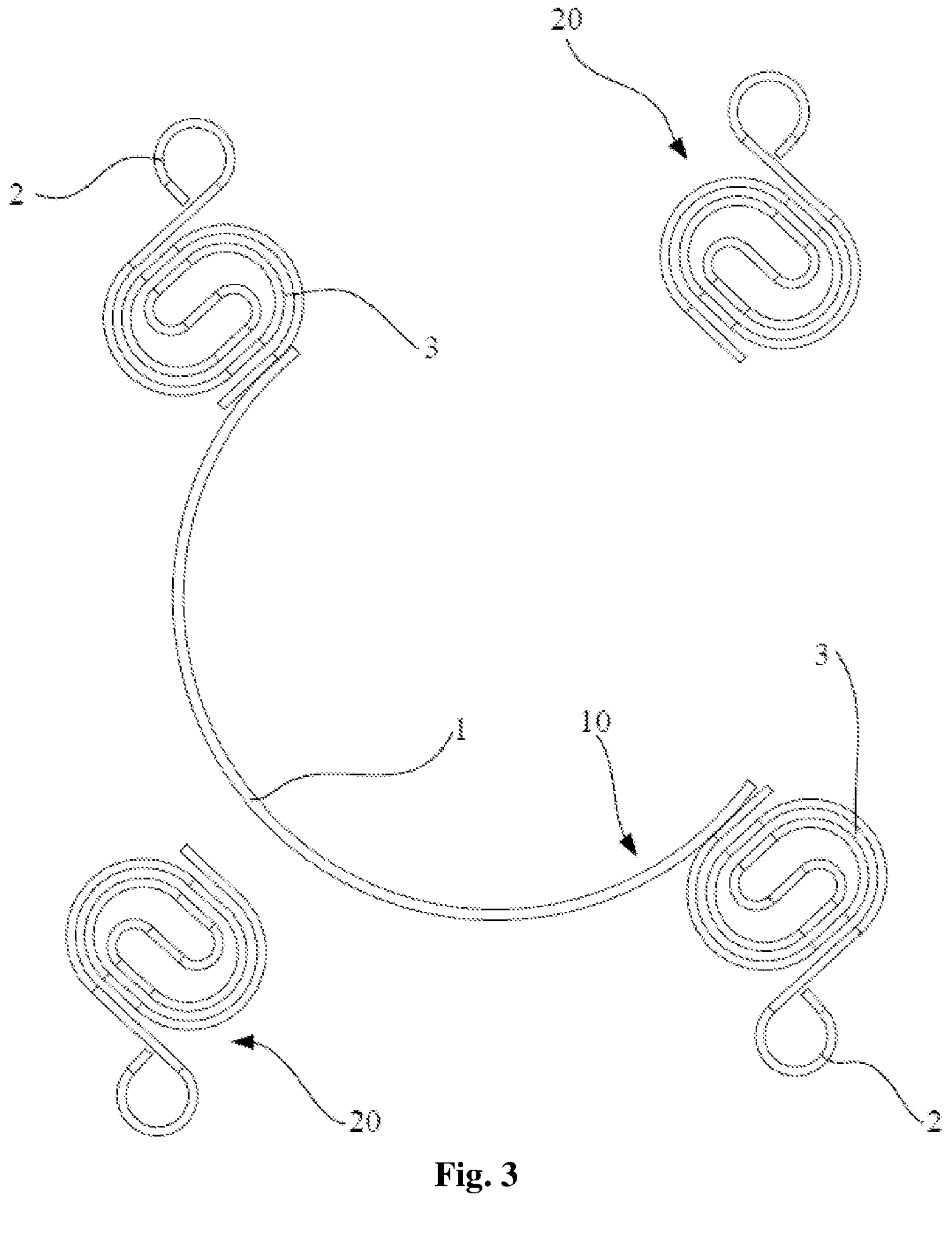
FIG. 3 is an exploded schematic view of a first elastic assembly and a second elastic assembly of the sound generation device according to an embodiment of the present disclosure.
Figure 4:
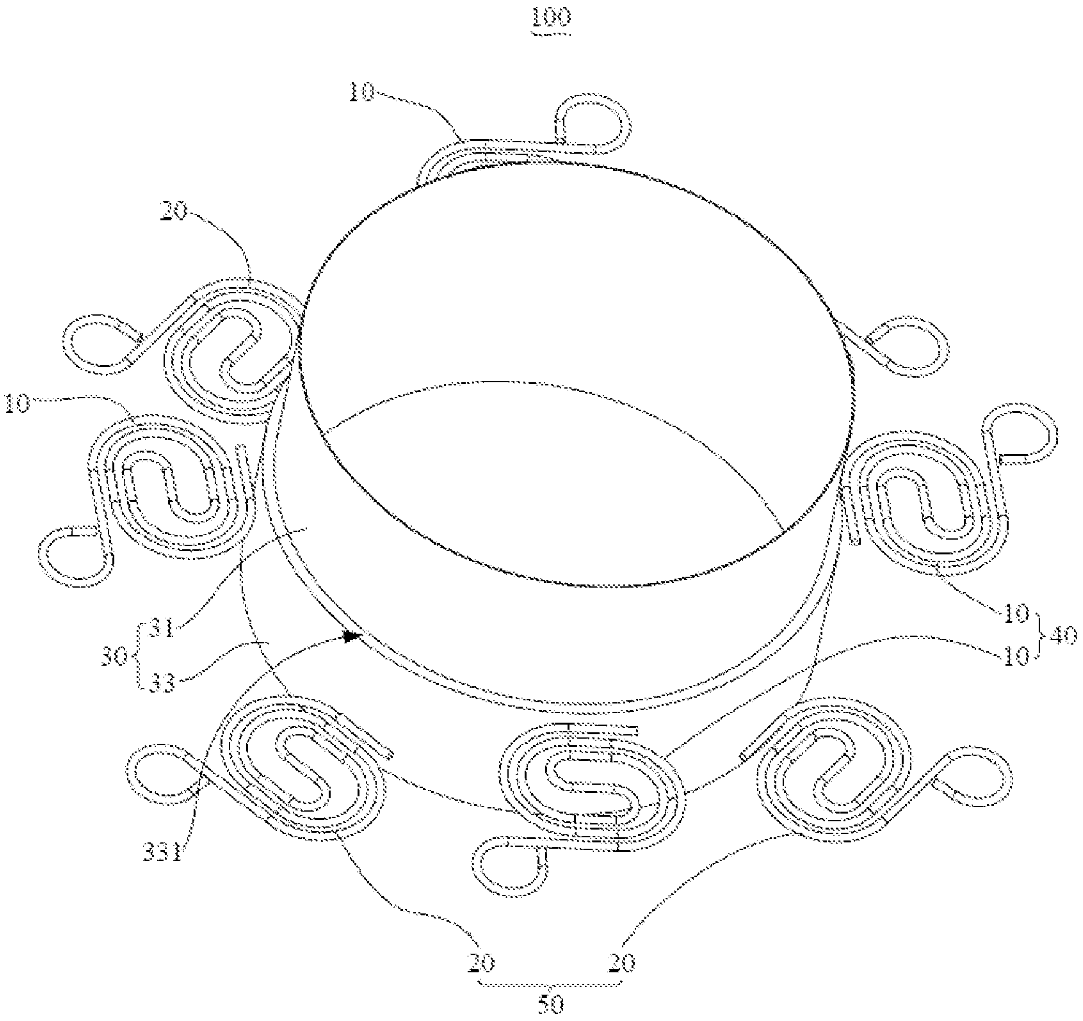
FIG. 4 is a structural schematic diagram of the sound generation device according to another embodiment of the present disclosure.
Figure 13:
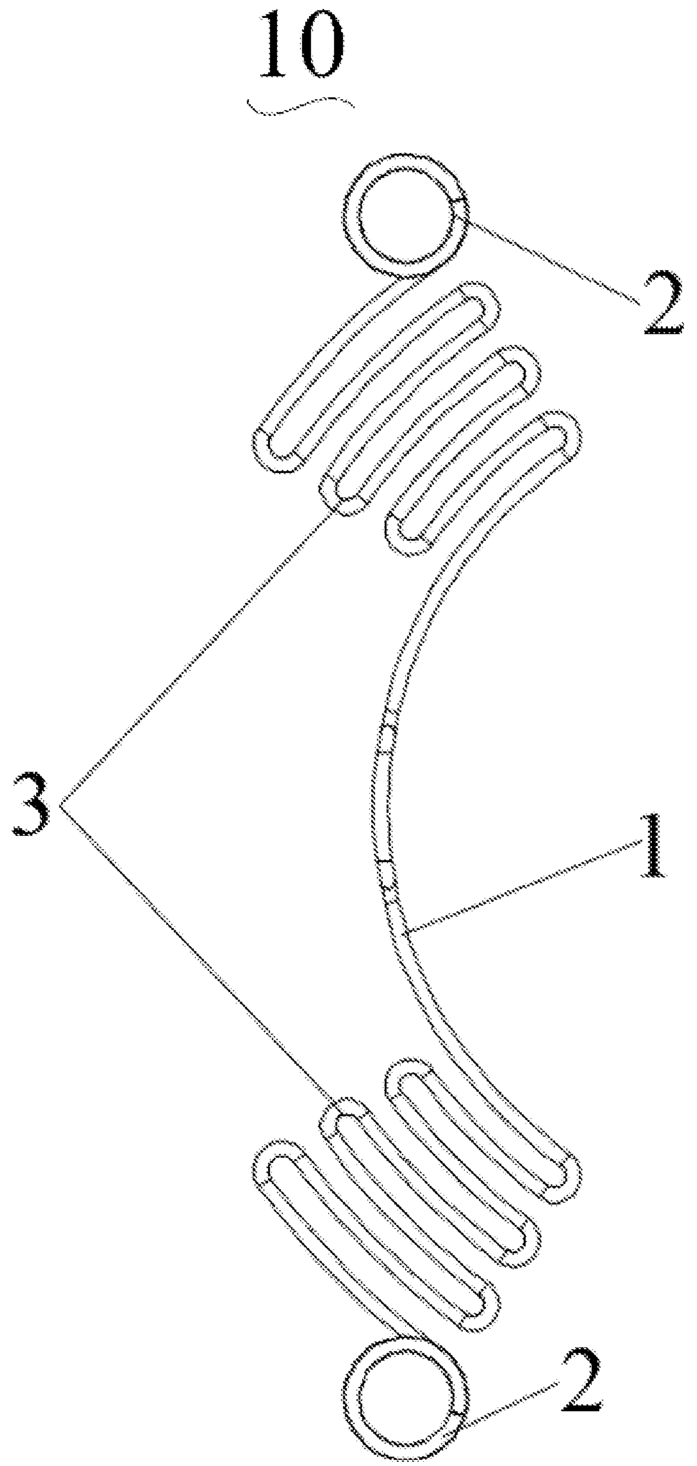
FIG. 13 is a structural schematic diagram of a first elastic connector of the sound generation device according to yet another embodiment of the present disclosure.
Figure 14:
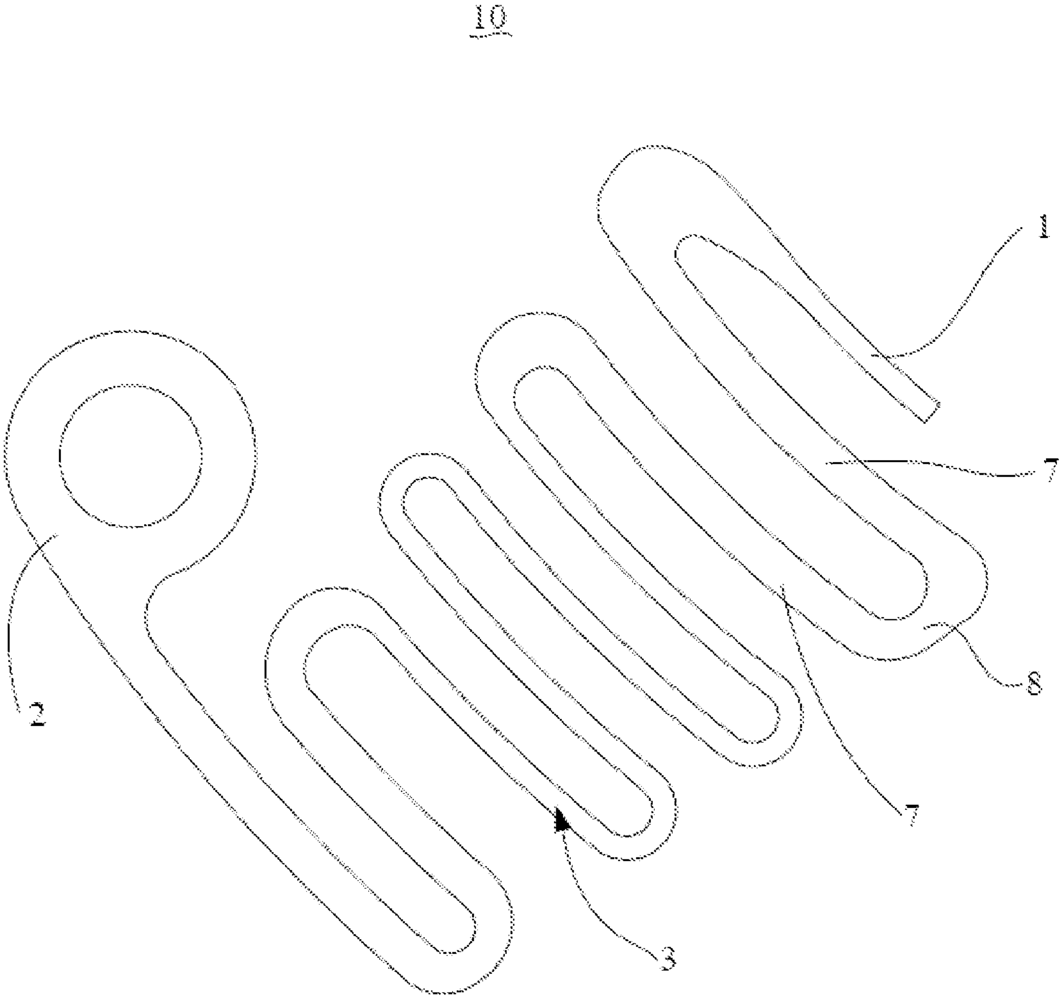
FIG. 14 is a structural schematic diagram of a first elastic connector of the sound generation device according to yet another embodiment of the present disclosure.

Referring to FIGS. 3 and 13, in some embodiments of the present disclosure, the first elastic connector 10 includes: at least two deformation parts 3, the at least two deformation parts 3 are arranged at intervals and connected to the first connection part 1; and at least two second connection parts 2, at least one of the second connection parts 2 is connected to a side of one of the deformation parts 3 away from the first connection part 1, and a projection region of at least two of the deformation parts 3 onto the plane where the first end surface 331 is located is at outside of the second projection region.

In the embodiment, the length of the first connection part 1 is long, and two deformation parts 3 are symmetrically distributed at both ends of the first connection part 1, or may be spaced apart in the middle of the first connection part 1. By providing a plurality of deformation parts 3, the first elastic connector 10 may allow larger displacement of the vibration unit 90, and the fixing effect of the first elastic connector 10 may be improved. The first connection part 1 may be arranged in an arc between the two deformation parts 3. The arc-shaped arrangement enables the first connection part 1 to have a certain deformation capacity, and improves the elastic deformation of the first elastic connector 10. It will be understood that when the vibration unit 90 is arranged in a rectangle or other shapes, the first connection part 1 may also be arranged in a straight line. By providing a plurality of second connection parts 2, the connection effect between the first elastic connector 10 and the housing can be ensured. In the embodiment, the second connection parts 2 and the deformation parts 3 may be disposed in one-to-one correspondence. In an embodiment, a plurality of second connection parts 2 is disposed to correspond to one deformation part 3.

It will be understood that, since the two deformation parts 3 of the embodiment need to be connected with the first connection part 1, the first connection part 1 is also used to connect with the vibration unit 90, when the second elastic connector 20 is provided, the first connection part 1 of the second elastic connector 20 may overlap with the first connection part 1 of the first elastic connector 10, and at this time, as long as it is ensured that the deformation part 3 of the first elastic connector 10 and the deformation part 3 of the second elastic connector 20 are misaligned, the elastic connectors can also be well fixed at different positions in the height direction of the vibration unit 90, thus the centering effect of the vibration unit 90 is improved, and the misalignment arrangement can avoid the interference between the elastic assemblies of different layers, which is more convenient for the processing and fixation of the connection portion between the vibration unit 90 and the elastic connector, and improves the connection effect.

Figure 5:
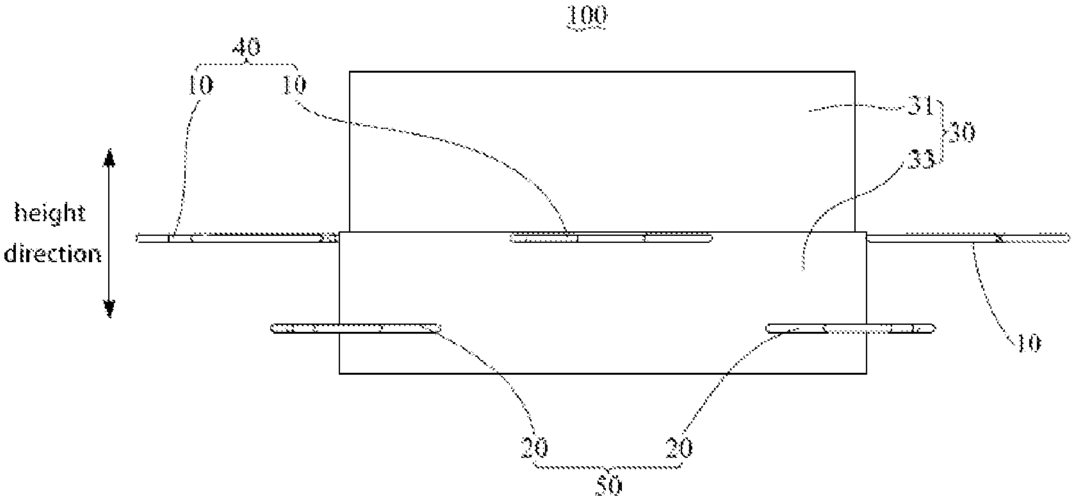
FIG. 5 is a side view of the sound generation device according to an embodiment of the present disclosure.
Figure 6:
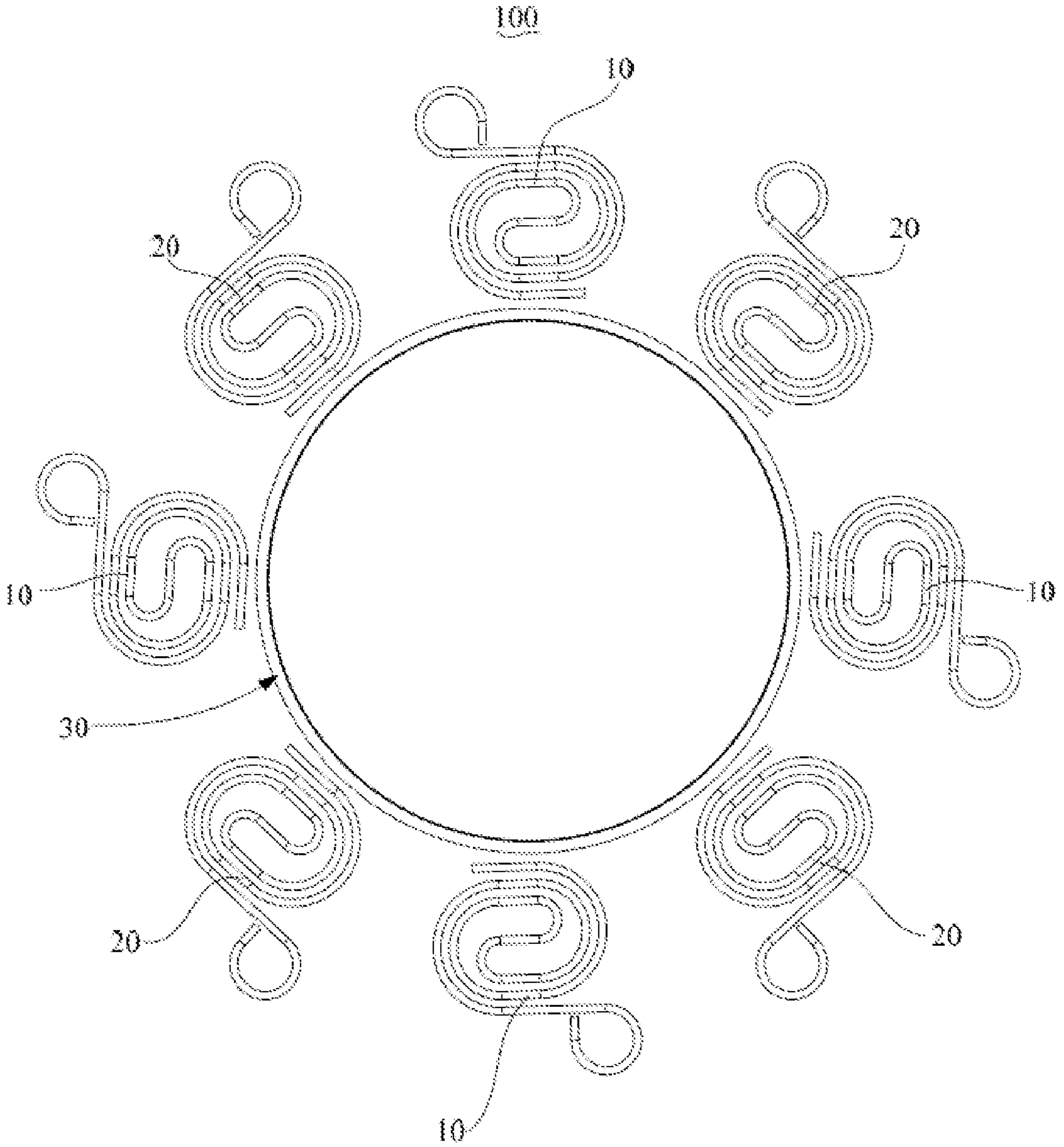
FIG. 6 is a top view of the sound generation device according to an embodiment of the present disclosure.

Referring to FIGS. 1 and 5, in some embodiments of the present disclosure, the voice coil 30 includes a bobbin 31 and a voice coil body 33 wound on the bobbin 31, and when the elastic member 60 connects the voice coil 30 and the support 80, the voice coil body 33 is configured to receive electrical signals, the first elastic assembly 40 is configured to be electrically connected with the voice coil body 33 to input an electrical signal to the voice coil body 33, and the second elastic assembly 50 is connected to the bobbin 31.

In an embodiment, the voice coil 30 includes a bobbin 31 and a voice coil body 33 wound on the bobbin 31, and when the elastic member 60 connects the voice coil 30 and the support 80, the voice coil body 33 is configured to receive electrical signals, the second elastic assembly 50 is configured to be electrically connected with the voice coil body 33 to input an electrical signal to the voice coil body 33, and the first elastic assembly 40 is connected to the bobbin 31.

In an embodiment, the voice coil 30 includes a bobbin 31 and a voice coil body 33 wound on the bobbin 31, and when the elastic member 60 connects the voice coil 30 and the support 80, the voice coil body 33 is configured to receive electrical signals, the first elastic assembly 40 and the second elastic assembly 50 are both configured to be electrically connected with the voice coil body 33 to input electrical signals to the voice coil body 33.

In the embodiment, the first elastic assembly 40 may be used to supply power to the voice coil body 33 independently. In an embodiment, the second elastic assembly 50 may be used to supply power to the voice coil body 33 independently. In an embodiment, the first elastic assembly 40 and the second elastic assembly 50 may be used to supply power to the voice coil body 33 simultaneously. In this way, the setting adaptability of power supply to the voice coil body 33 has been increased, and the specific power supply form can be set according to actual requirements.

In some embodiments of the present disclosure, the material of at least one of the first elastic connectors 10 and/or the material of at least one of the second elastic connectors 20 includes a conductive material, and one side of at least one of the first elastic connectors 10 and/or at least one of the second elastic connectors 20 is electrically connected to the voice coil body 33, and the other side thereof is electrically connected to an external circuit. In this way, the first elastic connector 10 or the second elastic connector 20 can supply power to the voice coil body 33, and other first elastic connectors 10 or second elastic connectors 20 that are not used to supply power may be provided as other materials, so that the elastic deformations of the first elastic assembly 40 and the second elastic assembly 50 can be adjusted adaptively according to actual requirements. Thus, the centering support of the first elastic assembly 40 and the second elastic assembly 50 for the voice coil 30 is improved, and the power supply is facilitated.

In some embodiments of the present disclosure, the first elastic connector 10 and/or the second elastic connector 20 is a structure formed by an elastic material, and the conductive material is formed on a surface of the first elastic connector 10 and/or the second elastic connector 20 by electroplating to form a metal plating layer. In an embodiment, the conductive material is formed on a surface of the first elastic connector 10 and/or the second elastic connector 20 by composite/etching to form a metal film layer. The metal plating layer/metal film layer forms a conductive path connecting the external circuit and the voice coil body 33. In the embodiment, the conductive function of the first elastic connector 10 or the second elastic connector 20 can be realized by providing the metal layer/metal film layer. The setting form of the metal layer/metal film layer can achieve good power supply, and the first elastic connector 10 or the second elastic connector 20 can thereby have good structural strength and elastic deformation.

In an embodiment, the elastic connector may be made of a non-magnetic conductive material, generally a non-ferrous metal, and specifically may be made of at least one of phosphor bronze, iron, steel or alloy materials, such materials are not susceptible to environmental changes, not easy to deform under high temperature and high humidity environment, and the hardness may not be changed, they have good fatigue resistance, so that the sound generation device 100 can work in severe operation conditions, therefore, the product performance can be optimized and the application universality of the sound generation device 100 can be improved.

In some embodiments of the present disclosure, the number of the vibration unit 90 is provided in plurality, and each of the vibration units 90 is connected to at least one first elastic assembly 40 and at least one second elastic assembly 50. In the embodiment, the sound generation device 100 may be a sound generation device 100 with a plurality of vibration units 90, and the sound generation device 100 with a plurality of vibration units 90 has more excellent sound generation effect. In the case of a plurality of vibration units 90, at least one first elastic assembly 40 and at least one second elastic assembly 50 are provided for each of the vibration units 90. In an embodiment, an elastic member 60 is provided so that good centering support can be achieved for each vibration unit 90 even in case where the vibration unit 90 has a large displacement. The specific effect can be referred to the above and will not be repeated here.

In some embodiments of the present disclosure, the housing is further provided with a plurality of fixing parts, and the fixing parts are used for fixing a side of the first elastic connector 10 and/or the second elastic connector 20 away from the vibration unit 90. The fixing part is an electrical connection terminal, which is used to fix the second connection part 2 of the first elastic connector 10 or the second elastic connector 20. When the fixing part is made of a conductive material, and the first elastic connector 10 or the second elastic connector 20 also has a conductive function, the voice coil body 33 can be energized through the first elastic connector 10 or the second elastic connector 20 by applying a voltage to the fixing part.

The present disclosure also provides an electronic apparatus including a sound generation device 100, the sound generation device 100 includes a support 80, a vibration unit 90 having a height direction, and at least two elastic members 60, each of which includes: a first elastic assembly 40 having at least one first elastic connector 10, one side of the first elastic connector 10 is connected to the vibration unit 90 and the other side thereof is connected to the support 80; and a second elastic assembly 50 having at least one second elastic connector 20, one side of the second elastic connector 20 is connected to the vibration unit 90 and the other side thereof is connected to the support 80. The first elastic assembly 40 and the second elastic assembly 50 are fixed at different positions in the height direction of the vibration unit 90. The vibration unit 90 has a first end surface 331 in the height direction. At least a portion of a first projection region of first elastic assembly 40 projected onto a plane where the first end surface 331 is located is at outside of a second projection region of the second elastic assembly 50 projected onto a plane where the first end surface 331 is located. In an embodiment, the first projection region is fully overlapped with the second projection region. Since the electronic apparatus as described above at least have all the beneficial effects brought by the technical solutions of the above embodiments, which will not be repeated here.

The above only describes the preferred embodiments of the present disclosure, and is not intended to limit the scope of the present disclosure. Any equivalent structural transformation made by using the contents of the description and drawings of the present disclosure within the scope of the present disclosure, or direct/indirect application in other relevant technical fields, is included in the scope of patent protection of the present disclosure.

What is claimed is:

1. A sound generation device comprising:

a support;

a vibration unit having a height direction;

a magnetic circuit system; and at least two elastic members, wherein each of the elastic members comprises:

a first elastic assembly having at least one first elastic connector, one side of the first elastic connector is connected to the vibration unit and the other side thereof is connected to the support; and a second elastic assembly having at least one second elastic connector, one side of the second elastic connector is connected to the vibration unit and the other side thereof is connected to the support, the first elastic assembly and the second elastic assembly are fixed at different positions in the height direction of the vibration unit, wherein at least a portion of a first projection region of the first elastic assembly projected onto a plane where the first end surface is located is at outside of a second projection region of the second elastic assembly projected onto a plane where the first end surface is located, or the first projection region is fully overlapped with the second projection region, wherein the vibration unit comprises a diaphragm and a voice coil connected with the diaphragm, and wherein the magnetic circuit system is formed with a magnetic gap, and the voice coil is arranged in the magnetic gap of the magnetic circuit system, wherein each of the at least one first elastic connector and the at least one second elastic connector comprise:

a first connection part connected with the vibration unit;

a second connection part connected with the support; and a deformation part between the first connection part and the second connection part, both ends of the deformation part are respectively connected with the first connection part and the second connection part, and at least a portion of the deformation part is a structure formed by winding, wherein at least one of the first elastic connectors and the second elastic connectors is a wire-like structure formed, by connecting at least two metal wires in parallel and side by side as a whole and then winding, or by intertwining at least two metal wires with each other and then winding.

2. The sound generation device of claim 1, wherein the first elastic assembly comprises a plurality of first elastic connectors, the plurality of first elastic connectors are located at same positions in the height direction of the vibration unit, and the projection region of at least one first elastic connector onto the plane where the first end surface is located is at outside of the second projection region.

3. The sound generation device of claim 2, wherein the second elastic assembly comprises a plurality of second elastic connectors, the plurality of second elastic connectors are located at same positions in the height direction of the vibration unit, and the projection region of the first elastic connector onto the plane where the first end surface is located is at outside of the projection region of the second elastic connector onto the plane where the first end surface is located.

4. The sound generation device of claim 3, wherein the sound generation device further comprises a third elastic assembly, the third elastic assembly comprises at least one third elastic connector, and the first elastic connector, the second elastic connector and the third elastic connector are fixed at different positions in the height direction of the vibration unit, and wherein at least a portion of the third projection region of the third elastic assembly projected onto the plane where the first end surface is located is at outside of the first and second projection regions, or the third projection region is fully overlapped with at least one of the first and second projection region.

5. The sound generation device of claim 1, wherein the first elastic assembly comprises a plurality of first elastic connectors, and the plurality of first elastic connectors are located at same positions in the height direction of the vibration unit, and wherein the second elastic assembly comprises a plurality of second elastic connectors, and the plurality of second elastic connectors are located at same positions in the height direction of the vibration unit, and the projection region of the first elastic connector onto the plane where the first end surface is fully overlapped with the projection region of the second elastic connector onto the plane where the first end surface is located.

6. The sound generation device of claim 1, wherein the deformation part comprises a first end connected with the first connection part, and a second end connected with the second connection part, and a central area between the first end and the second end, and wherein the deformation part is formed by extending from the first end to the central area in a straight line or a curve along a first direction, then extending from the central area to the second end in a straight line or a curve along a direction opposite to the first direction.

7. The sound generation device of claim 6, wherein the deformation part is arranged in a helical shape, or has a wire-like structure formed by winding.

8. The sound generation device of claim 1, wherein the wire-like structure formed by winding the metal wire comprises a first wire segment and a second wire segment, and a diameter of the second wire segment is larger than a diameter of the first wire segment, or the wire-like structure formed by winding the metal wire has a plurality of cross-sections, and the plurality of cross-sections have different widths.

9. The sound generation device of claim 1, wherein the first elastic connector comprises:

at least two deformation parts, the at least two deformation parts are arranged at intervals and connected to the first connection part; and at least two second connection parts, at least one of the second connection parts is connected to a side of one of the deformation parts away from the first connection part, and projection regions of at least two of the deformation parts onto the plane where the first end surface are located is at outside of the second projection region.

10. The sound generation device of claim 1, wherein the elastic member connects the voice coil and the support, or the vibration unit further comprises a cup, the voice coil and the cup are arranged on the same side of the diaphragm, and the elastic member connects the cup and the support, and wherein the support is a housing or a magnetic yoke.

11. The sound generation device of claim 10, wherein the voice coil comprises a bobbin and a voice coil body wound on the bobbin, and when the elastic member connects the voice coil and the support, the voice coil body is configured to receive electrical signals, at least one of the first elastic assembly and the second elastic assembly are electrically connected with the voice coil body to input electrical signals to the voice coil body.

12. The sound generation device of claim 11, wherein the material of at least one of the first elastic connectors and the material of at least one of the second elastic connectors comprises a conductive material, and one side of at least one of the first elastic connectors and at least one of the second elastic connectors is electrically connected to the voice coil body, and the other side thereof is electrically connected to an external circuit.

13. The sound generation device of claim 12, wherein the first elastic connector and the second elastic connector is a structure formed by an elastic material, and wherein the conductive material is formed on a surface of at least one of the first elastic connector and the second elastic connector by electroplating to form a metal plating layer or by composite/etching to form a metal film layer, and wherein the metal plating layer/metal film layer forms a conductive path connecting the external circuit and the voice coil body.

14. The sound generation device of claim 1, wherein the number of the vibration unit is provided in plurality, and each of the vibration units is connected to at least one first elastic assembly and at least one second elastic assembly, or each of the vibration units is connected to an elastic member.

15. The sound generation device of claim 1, wherein the housing is further provided with a plurality of fixing parts, and the fixing parts are used for fixing a side of the first elastic connector and the second elastic connector away from the vibration unit.

16. The sound generation device of claim 15, wherein the material of the fixing parts comprises a conductive material, and is used for connecting to an external circuit.

17. An electronic apparatus comprising the sound generation device of claim 1.

* * * * *